United States Patent
Tobita

(10) Patent No.: US 10,288,833 B2
(45) Date of Patent: May 14, 2019

(54) OPTICAL COMPONENT, OPTICAL COMPONENT MANUFACTURING METHOD, AND CAMERA

(71) Applicant: CANON KABUSHIKI KAISHA, Tokyo (JP)

(72) Inventor: Shusuke Tobita, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/630,653

(22) Filed: Jun. 22, 2017

(65) Prior Publication Data

US 2018/0003917 A1     Jan. 4, 2018

(30) Foreign Application Priority Data

Jun. 30, 2016   (JP) .................. 2016-130910

(51) Int. Cl.

| | | |
|---|---|---|
| *G02B 7/02* | (2006.01) | |
| *F21V 17/00* | (2006.01) | |
| *G03B 21/14* | (2006.01) | |
| *H04N 5/225* | (2006.01) | |
| *B29D 11/00* | (2006.01) | |
| *G02B 1/04* | (2006.01) | |
| *G02B 23/14* | (2006.01) | |
| *B29C 45/14* | (2006.01) | |
| *B29K 69/00* | (2006.01) | |
| *B29L 11/00* | (2006.01) | |

(52) U.S. Cl.
CPC ........ *G02B 7/022* (2013.01); *B29C 45/14311* (2013.01); *B29C 45/14754* (2013.01); *B29D 11/00009* (2013.01); *B29D 11/0048* (2013.01); *G02B 1/041* (2013.01); *G02B 23/14* (2013.01); *B29C 2045/14327* (2013.01); *B29C 2045/14762* (2013.01); *B29K 2069/00* (2013.01); *B29K 2995/0012* (2013.01); *B29L 2011/0016* (2013.01)

(58) Field of Classification Search
CPC ........ G02B 3/00; G02B 7/021; G02B 27/145; G02B 3/0056; G02B 3/0062; G02B 5/045; G02B 21/14; G02B 7/10; G02B 25/002; G02B 7/02; G02B 7/04; G02B 7/08; G02B 7/102; F21V 9/08; G03B 17/14; G03B 21/56; G03B 21/625; G03B 21/602; H04N 5/2254; H04N 5/2253; H04N 5/2251; B29L 2011/0016; B29D 11/0073
USPC .......... 359/811–830, 703; 362/455; 353/100; 396/529–530; 348/373–374
See application file for complete search history.

(56) References Cited

U.S. PATENT DOCUMENTS

| | | | | |
|---|---|---|---|---|
| 4,198,144 A | * | 4/1980 | Matsumura | A61B 3/14 351/206 |
| 4,805,991 A | * | 2/1989 | Arai | B29C 45/1642 264/328.8 |
| 2006/0012749 A1 | * | 1/2006 | Ai | B29C 45/16 351/158 |

FOREIGN PATENT DOCUMENTS

JP         2004-53879 A        2/2004

* cited by examiner

*Primary Examiner* — Dawayne Pinkney
(74) *Attorney, Agent, or Firm* — Canon U.S.A., Inc. IP Division

(57) ABSTRACT

A portion of a holder is in contact with a lens surface, a holding portion configured to hold a lens in the holder is provided, and a mold shrinkage factor of a material that forms the holder is smaller than a mold shrinkage factor of a material that forms the lens by no less than 0.3%.

11 Claims, 7 Drawing Sheets

OPTICAL COMPONENT, OPTICAL COMPONENT MANUFACTURING METHOD, AND CAMERA

BACKGROUND

Field of the Disclosure

The present disclosure relates to optical components and optical component manufacturing methods and relates, for example, to an optical component such as a lens with holder to be used in a viewfinder of a digital single-lens reflex camera and to a method of manufacturing such an optical component.

Description of the Related Art

Resin lenses find practical use in a variety of applications, for example, as an imaging lens in a digital camera, as a pick-up lens for recording onto and playing back an optical disc, and as a projection lens in a projector. Such resin lenses are typically manufactured through injection molding for the purpose of reducing the cost. In order to embed a resin lens into a product as a component and make the product function, the lens may be placed in a frame-like lens holder and integrated with the lens holder in post-processing. Such a lens holder is sometimes called a lens barrel but is referred to as a holder in the present specification. Such a holder may make it easier to attach a lens to a camera, may function as a driving component for moving a lens, or may have a function of blocking light to suppress ghost caused by reflection at a side surface of a lens (i.e., mask).

An adhesive is typically used to integrate a lens and a holder into a unit with the lens held in the holder. However, the use of an adhesive raises an issue of increased cost for bonding in post-processing. Japanese Patent Laid-Open. No. 2004-53879 discloses a method of manufacturing a lens with holder. This method employs double molding in which a resin material for the holder is injected into a cavity first and then a resin material for the lens is injected.

According to the method disclosed in Japanese Patent Laid-Open No. 2004-53879, a projection is provided on an inner peripheral surface of the holder, and the resin for the lens is made to surround the projection to thus bond the holder and the lens. An alicyclic structure-containing polymer resin is used as the resin for the lens. It is indicated that the difference between the mold shrinkage factor of the resin material for the holder and the mold shrinkage factor of the resin material for the lens is preferably in the range from 0% to 0.2%.

FIG. 7 is an illustration describing Japanese Patent Laid-Open. No. 2004-53879 and is a sectional view of the lens with holder described in Japanese Patent Laid-Open No. 2004-53879 taken along a plane that contains the optical axis of the lens and that is parallel to the optical axis. FIG. 7 illustrates a configuration in which the entire side surface of a resin lens 81 is covered by a resin holder 82. A projection portion. 85 is present on the inner periphery of the resin holder 82. As the lens material surrounds the projection portion 85 and is solidified, an undercut portion is formed. The lens 81 is held in the holder 82 as the holder 82 cuts into the lens 81 in the direction perpendicular to the optical axis of the lens 81.

However, when an alicyclic structure-containing polymer resin is used as a resin material for the lens as in Japanese Patent Laid-Open No. 2004-53879, the adhesive force at the interface between the holder and the lens becomes unstable, for example, because the polycarbonate resin used for the holder material is not mixed sufficiently with the alicyclic structure-containing polymer resin at the interface.

To address this issue, the difference between the mold shrinkage factor of the resin material for the holder and the mold shrinkage factor of the resin material for the lens is made as small as 0% to 0.2%, according to Japanese Patent Laid-Open No. 2004-53879. Although this configuration is intended to suppress peeling at the interface that could be caused by the difference in the amount of thermal deformation after molding, the adhesive force at the interface between the holder and the lens is often unable to withstand physical impacts and heat cycles continuously.

When the adhesive force at the interface between the holder and the lens is unstable, the adhesive force between the holder and the lens may be relieved (peeling may occur at the interface) after the molded product is removed from the mold. Thus, the timing at which the adhesive force is relieved (peeling occurs at the interface) may vary among the molded products. It is desirable that a lens be cooled naturally after the lens is removed from a mold without being affected by an external force. However, there has been the following problem. Specifically, the timing at which peeling occurs varies among molded products, or peeling occurs at a portion of a molded product but does not occur in another portion of the molded product during cooling and stress is produced at the portion at which peeling does not occur, which causes the optical surface to be distorted. This can lead to an unstable surface accuracy of the lens and prevent an optical component with high accuracy from being obtained.

SUMMARY

An aspect of the present disclosure provides an optical component including a lens having a lens surface held in a holder, a portion of the holder in contact with the lens surface, and a holding portion configured to hold the lens in the holder, in which a mold shrinkage factor of a material that forms the holder is smaller than a mold shrinkage factor of a material that forms the lens by no less than 0.3%.

Another aspect of the present disclosure provides a camera that includes the above optical component.

Yet another aspect of the present disclosure provides an optical component manufacturing method for manufacturing an optical component in which a lens is held in a holder by injecting a molten resin into a cavity in a mold. The holder includes a front surface, a back surface, an outer peripheral surface, and an inner peripheral surface, the front surface and the outer peripheral surface are made to be in contact with the mold to constitute a portion of the cavity, and a molten resin having a mold shrinkage factor that is greater than a mold shrinkage factor of a material that forms the holder by no less than 0.3% is injected.

According to these aspects of the present disclosure, an optical component having a high optical surface accuracy can be obtained stably.

Further features of the present disclosure will become apparent from the following description of exemplary embodiments with reference to the attached drawings.

DESCRIPTION OF THE EMBODIMENTS

Figure 1A:
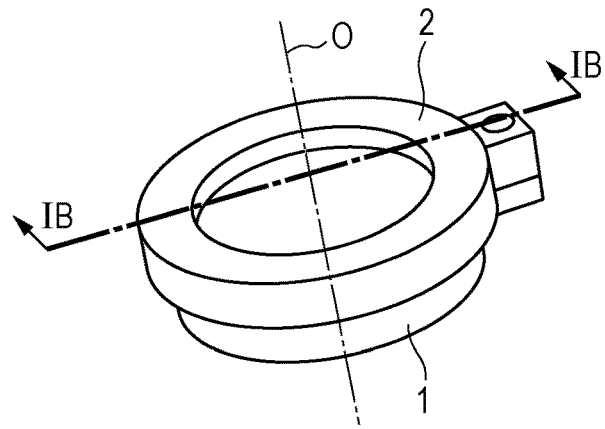
FIGS. 1A and 1B are illustrations describing an optical component according to an exemplary embodiment.
Figure 1B:
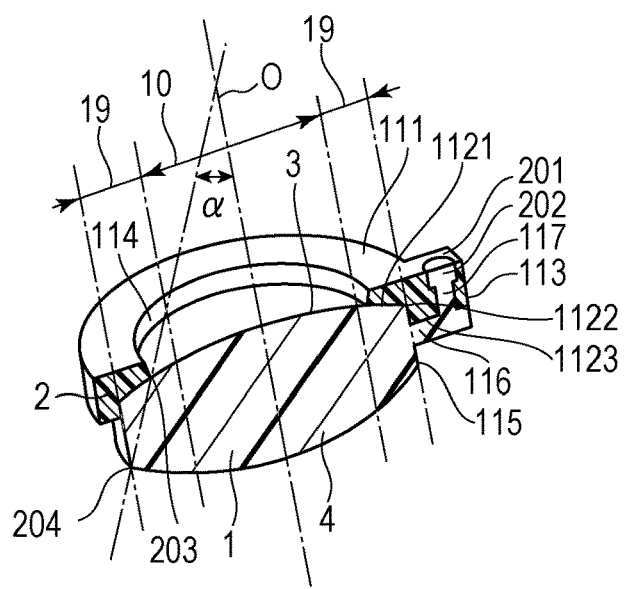

FIGS. 1A and 1B illustrate a lens with holder, which serves as an optical component according to an exemplary embodiment of the present disclosure. FIG. 1A is a bird's-eye view of the lens with holder, which serves as an optical component according to the present exemplary embodiment. FIG. 1B is a sectional view of the lens with holder, which serves as the optical component according to the present exemplary embodiment, taken along a plane that contains an optical axis O of the lens and that is parallel to the optical axis O (IB-IB section). The lens with holder includes a lens 1, and FIGS. 1A and 1B illustrate an example in which the lens 1 according to the present exemplary embodiment is an eyepiece. The lens 1 includes an ocular-side lens surface 3, an objective-side lens surface 4, and a side surface 115. A projection portion 117 to be fitted into a hole 202 in the holder projects from an attachment portion 116. The attachment portion 116 and the projection portion 117 partially constitute the lens 1.

A holder 2 includes a front surface 111, a back surface 112 (1121, 1122, 1123), an outer peripheral surface 113, and an inner peripheral surface 114. FIG. 1B illustrates an optically effective region 10 and an optically ineffective region 19. The holder 2 is a cylindrical member disposed adjacent to the outer peripheral portion (optically ineffective region 19) of one of the surfaces of the lens 1, and the back surface 112 is in contact with the lens 1. In the present exemplary embodiment, the back surface 112 of the holder 2 includes a plurality of surfaces. Specifically, in a case in which the lens 1 is an eyepiece, a first back surface 1121 of the back surface 112 of the holder 2 is in contact with the ocular-side lens surface 3 in the optically ineffective region 19, a second back surface 1122 is in contact with a portion of the side surface 115 of the lens 1, and a third back surface 1123 is in contact with the attachment portion 116 of the lens 1. With this configuration, the holder 2 provides the lens 1 with a function of blocking light.

The holder 2 may include, aside from the cylindrical portion described above, an assembly portion 201 to be fitted with surrounding components. The projection portion 117 of the lens 1 is fitted into the hole 202 in the holder 2, and thus the holder 2 is fixed to the lens 1 with the holder 2 being adjacent to the ocular-side lens surface 3. The hole 202 in the holder 2, in which the projection portion 117 of the lens 1 is fitted, may be provided adjacent to the assembly portion 201 or may be provided at another position. The optically effective region 10 on the ocular-side lens surface 3 is enclosed by the inner peripheral surface 114. It is preferable that the diameter of the projection portion 117 increase toward the front surface 111 of the holder 2 from the attachment portion 116 of the lens 1. This configuration allows the projection portion 117 of the lens 1 to have an undercut shape with respect to the holder 2, and the lens 1 is held more firmly. In the present exemplary embodiment, the attachment portion 116, the projection portion 117, and the hole 202, into which the projection portion 117 of the holder 2 is to be fitted, constitute a holding portion for holding the lens 1 in the holder 2.

The front surface 111 of the holder 2 has a function of reflecting the light incident thereon from the ocular side toward the outside of the lens 1. Thus, it is preferable that the front surface 111 lie along a plane perpendicular to the optical axis O of the lens 1. The surface 111 may be inclined in the direction in which the thickness of the holder 2 decreases from the center of the lens 1 toward the outer periphery thereof. When the front surface 111 is inclined, light reflected by the front surface 111 of the holder 2 travels toward the outside, and an influence of such light on the optical performance can be reduced.

It is preferable that the back surface 112 of the holder 2 have a shape that follows the optical surface of the ocular-side lens surface 3. However, the back surface 112 may be perpendicular to the optical axis O or may be inclined relative to the optical axis O.

The angle of the outer peripheral surface 113 of the holder 2 relative to the optical axis O of the lens 1 is not particularly limited. Although it is preferable that the outer peripheral surface 113 be inclined in the direction in which the holder 2 is inserted into a mold in order to make it easier to insert the holder 2 into the mold, the outer peripheral surface 113 may be parallel to the optical axis O of the lens 1.

The inner peripheral surface 114 of the holder 2 is adjacent to the back surface 112. It is preferable that the inner peripheral surface 114 be inclined at an angle of no smaller than 20° nor greater than 80° relative to the plane perpendicular to the optical axis O of the lens 1 so that the aperture increases from the center of the lens 1 toward the ocular side. When the stated angle is no greater than 20°, the effect of suppressing ghost decreases. When the stated angle is no smaller than 80°, the draft to be provided when molding the holder 2 is reduced, which makes it difficult to mold the holder 2.

It is preferable that an angle a formed by the optical axis O of the lens 1 and a line connecting an intersection 203 of the inner peripheral surface 114 and the back surface 112 with an edge portion 204 of the objective-side lens surface 4 be no smaller than 10° in consideration of suppressing ghost. In other words, as the angle a is greater, the amount of light incoming from the side surface 115 of the lens 1 and reaching the eye decreases, and thus ghost is suppressed.

It is preferable that the holder 2 be made of a resin having a light-blocking function. It is preferable that the holder 2 be made of a material that is colored in black by a dye, for example.

The resin having a light-blocking function is preferably a material that, for example, contains a containing material such as a glass filler in an amount of no less than 10% by weight nor greater than 30% by weight relative to the weight of the entire holder 2 and has a mold shrinkage factor that is smaller than the mold shrinkage factor of the resin for the lens 1 by no less than 0.3%. The containing material may be a carbon filler or any other inorganic materials that are not compatible with resin. It is preferable that the containing material be reinforced fiber. In the present specification, the mold shrinkage factor is a value obtained by dividing, by the length of the side of a cubic sample mold, the length obtained by subtracting the length of the side of a molded product, which is obtained by pouring a molten resin into the sample mold and by cooling the molten resin to be solidified, removed from the sample mold from the length of the side of the sample mold (i.e., the length by which the molded produced has shrunk). Specifically, the mold shrinkage factor is a value obtained by the following formula.

$$S=(A-B)/A$$

S: the mold shrinkage factor
A: the length of the side of a cubic sample mold
B: the length of the side of a molded product which is obtained by pouring a molten resin into the sample mold and by cooling the molten resin to be solidified, removed from the sample mold from the length of the side of the sample mold (i.e., the length by which the molded produced has shrunk)

The mechanical strength, the mold shrinkage factor, and the smoothness of the surface vary depending on the weight content of the containing material. Even when the weight content is constant, the mechanical strength, the mold shrinkage factor, and the smoothness of the surface vary depending on the fiber length of the containing material. It is preferable that the fiber shape or the content of the containing material be selected in consideration of not only the mold shrinkage factor but also the strength and the surface nature desired for a product.

In addition, it is preferable that the content of the containing material (reinforced fiber) be no less than 10% by weight nor greater than 50% by weight with respect to the content of the material forming the holder 2.

Materials with the content of the containing material exceeding 50% by weight have poor flowability and are thus not suitable for a molding material of the holder 2.

Materials with the content of the containing material falling below 10% by weight have insufficient mechanical strength and are thus not suitable for a material of the holder 2.

It is preferable that a base material of a resin material for the holder 2 be a material that contains polycarbonate in an amount of no less than 50% by weight. Although details will be given later, a high-temperature molten resin for molding the lens 1 is poured into a mold with the holder 2 being inserted in the mold. At this point, if the holder 2 is made of polycarbonate, the holder 2 is less likely to be molten by the heat from the high-temperature resin poured into the mold for molding the lens 1 (also referred to as a lens resin in the present specification) due to the high glass transition temperature of polycarbonate.

Aside from polycarbonate described above, a material that contains polycarbonate into which ABS is mixed, ABS, PS, or PMMA in an amount of no less than 10% by weight can be used. Alternatively, a material that contains a composite material of polycarbonate, ABS, PS, or PMMA in an amount of no less than 10% by weight can also be used.

It is preferable that the resin material for the lens 1 be a resin material that contains a cyclic olefin in an amount of no less than 50% by weight. Cyclic olefin-based resin materials are nonpolar. Such materials are not mixed at the interface sufficiently with polar resin materials. If both of the materials are mixed enough, the great adhesion is obtained. The adhesion is low when the difference in the solubility parameter (SP value) is large, and a combination of resin materials having the difference in the solubility parameter (SP value) of no less than 0.5 is preferable.

A combination of resins that are compatible leads to an increased adhesive force between the lens 1 and the holder 2, and the lens 1 and the holder 2 influence each other in their deformation caused by the difference in thermal expansion, the difference in thermal contraction, and the difference in moisture absorption, which leads to a variation in the optical performance associated with an environmental variation.

In the optical component according to an exemplary embodiment of the present disclosure, the material that forms the lens 1 and the material that forms the holder 2 are not mixed at the interface sufficiently (to rephrase, the compatibility between the material that forms the lens 1 and the material that forms the holder 2 is low), and thus a strong adhesion only at the interface cannot be expected. A separate structure for holding the lens 1 in the holder 2 stably becomes necessary. According to the exemplary embodiment illustrated in FIGS. 1A and 1B, the hole 202 is provided in a portion of the assembly portion 201, and a lens resin is poured into the hole 202 when the lens 1 is molded with the holder 2 being inserted in the mold. When the diameter of the hole 202 decreases toward the attachment portion 116 of the lens 1, the hole 202 serves as an undercut structure when the lens resin is solidified, and the lens 1 is held firmly in (fixed to) the holder 2. The present exemplary embodiment is merely an example, and the location and the structure of the holding portion for holding the lens 1 in the holder 2 is not particularly limited.

Next, a method of manufacturing an optical component according to the present exemplary embodiment will be described.

The optical component, which is a lens with holder, according to the present exemplary embodiment is manufactured by injecting a high-temperature molten resin (lens resin) for molding the lens 1 with the holder 2 being inserted in a mold and by allowing the lens resin to flow over the back surface 112 of the holder 2. Then, by allowing the lens resin to flow around a portion of the holder 2, the holder 2 is made to hold the lens 1 and to have a light-blocking function.

Figure 2:
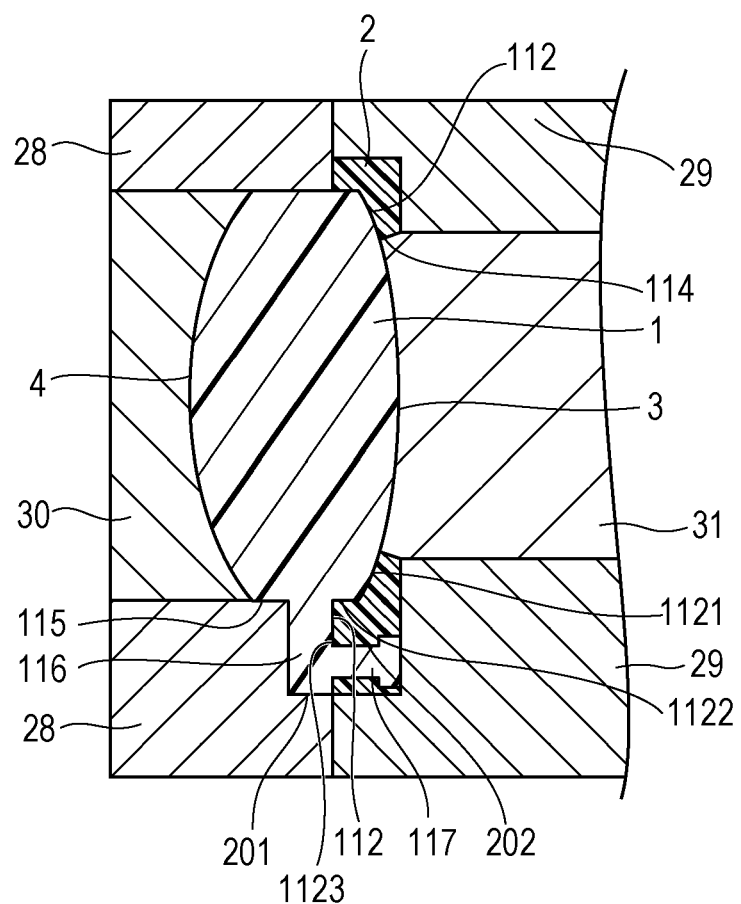
FIG. 2 is an illustration describing a mold used in a method of manufacturing an optical component according to an exemplary embodiment.

FIG. 2 illustrates a sectional view of the interior of the mold when the lens 1 is molded. FIG. 2 illustrates a state in which the molten resin (lens resin), which is a material for forming the lens 1, has been injected into the cavity with the holder 2 being inserted in the mold and the filling has been completed. Publicly known techniques are used for the gate, the overall structure of the mold, and the injection molding machine, and thus descriptions thereof will be omitted.

A mold component 31 transfers the ocular-side lens surface 3, a mold component 30 transfers the objective-side lens surface 4, a mold component 29 houses the mold component 31, and a mold component 28 houses the mold component 30. The mold component 28 that houses the mold component 30 is provided with a shape that transfers the side surface 115 of the lens 1 and a portion of the assembly portion 201. The mold component 28 that houses the mold component 30, the mold component 31 that transfers the ocular-side lens surface 3, the mold component 30 that transfers the objective-side lens surface 4, the back surface 112 of the holder 2, and the hole 202 provided with a step constitute the cavity.

The molten resin (lens resin), which is a lens material, that has been injected into and filling the cavity bonds with the inserted holder 2 inside the cavity, and the molded product is removed from the mold after the cooling process.

At the time when the injection has been completed, the ocular-side lens surface 3 is in contact with the mold component 31 that transfers the ocular-side lens surface 3, and the objective-side lens surface 4 is in contact with the mold component 30 that transfers the objective-side lens surface 4. In addition, the side surface 115 of the lens 1 and a portion of the assembly portion 201 are in contact with the mold component 28 that houses the mold component 30 that transfers the objective-side lens surface 4. The lens resin is in contact with the back surface 112 of the holder 2, and the interface therebetween is in tight contact. At this point, the holder 2 is in a state in which the molecules therein can easily move upon being subjected to the heat and the force of the lens resin.

Thereafter, the lens resin undergoes the cooling process, and the mold shrinkage occurs. The mold shrinkage factor of the resin that forms the holder 2 (also referred to as a holder resin in the present specification) is smaller than the mold shrinkage factor of the lens resin by no less than 0.3%. Thus, the lens 1 shrinks more than the holder 2 does. When the difference in the mold shrinkage factor is no less than 0.3%, the shrinkage effect surpasses the force that retains the tight contact state, and thus the air enters into the interface during the cooling process to reduce (or eliminate) the adhesive force.

In the cooling process, the optical surface of the lens 1 is in tight contact with the surface of the mold, and the lens 1 is tightly held therein. Thus, even if the adhesive force at the interface between the holder 2 and the lens 1 is reduced (or eliminated), the surface accuracy is hardly affected.

It is preferable that the area in which the holder 2 is in contact with the lens 1 be small. This configuration reduces the adhesive force between the holder 2 and the lens 1, and thus the adhesive force can be reduced (or eliminated) more easily than when the holder 2 entirely covers the lens 1.

In this manner, by actively allowing the adhesive force between the holder 2 and the lens 1 to be reduced. (or eliminated), the tight contact state at the interface between the holder 2 and the lens 1 ceases to be unstable. In other words, this prevents the timing at which the adhesive force is reduced (or eliminated) from varying among the molded products. This can reduce a variation in the surface accuracy of the lens 1 associated with a variation in the adhesive force at the interface between the holder 2 and the lens 1 (the force with which the holder 2 holds the lens 1), and an optical component with high accuracy can be obtained.

FIRST WORKING EXAMPLE

Next, working examples will be described. An optical component (lens with holder) obtained through the present working example and a method of manufacturing the optical component will be described with reference to FIGS. 3, 4A, and 4B.

Figure 3:
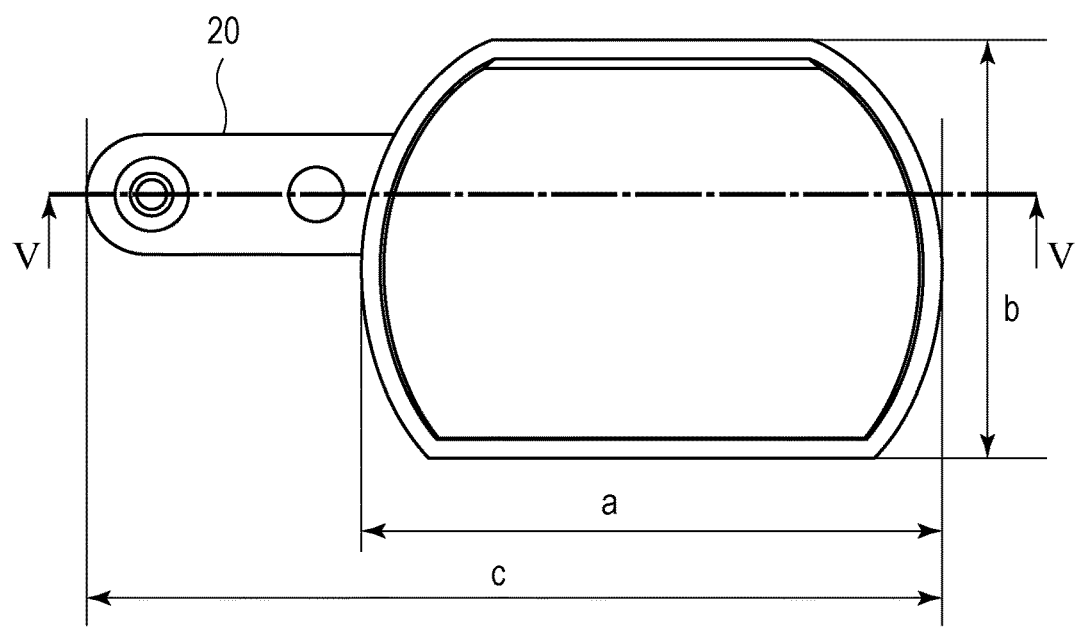
FIG. 3 is an illustration describing a working example according to an exemplary embodiment.
Figure 4A:
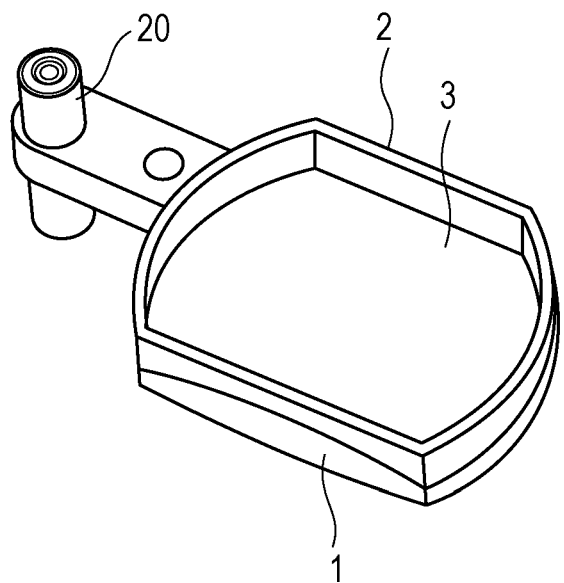
FIGS. 4A and 4B are illustrations describing a working example according to an exemplary embodiment.
Figure 4B:
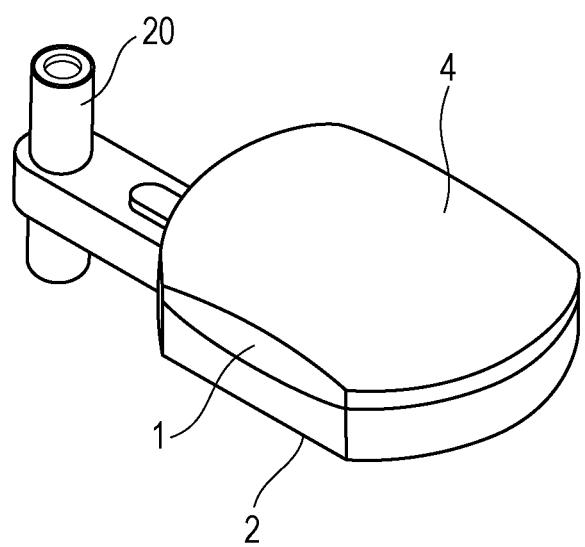

FIG. 3 is a schematic diagram of the optical component manufactured in the working example. FIG. 4A is a bird's-eye view as viewed from the side of an ocular-side lens surface 3. FIG. 4B is a bird's-eye view as viewed from an objective-side lens surface 4. The optical component includes a lens 1 and a holder 2. As the lens 1, for example, a lens that constitutes a viewfinder of a digital single-lens reflex camera and that is used as a lens for adjusting the diopter was manufactured. The holder 2 to which a sleeve 20 is connected was manufactured. A core is inserted into the sleeve 20, and the optical component is embedded into a camera such that the optical component can be slid in the direction of the optical axis. The holder 2 was manufactured to have the following dimensions: the widthwise dimension b of 15.3 mm, the lengthwise dimension a of 21.06 mm. A cyclic olefin-based polymer was used as the material for forming the lens 1. The temperature of deflection under load was 122° C., and the mold shrinkage factor was 0.6%. Black polycarbonate in which a glass filler was mixed was used as the material for forming the holder 2. The fiber diameter of the glass filler was 10μm, and long fiber having a length of no less than 100 μm and short fiber having a length of less than 100 μm were blended. Such glass filler was mixed in an amount of 20% to obtain the mold shrinkage factor of 0.3% and the temperature of deflection under load of 137° C. The lens 1 is a biconvex lens having a spherical lens surface 3 on the ocular side and an aspherical lens surface 4 on the objective side. The mold was designed so that the maximum thickness of the lens 1 was 4.46 mm.

Figure 5:
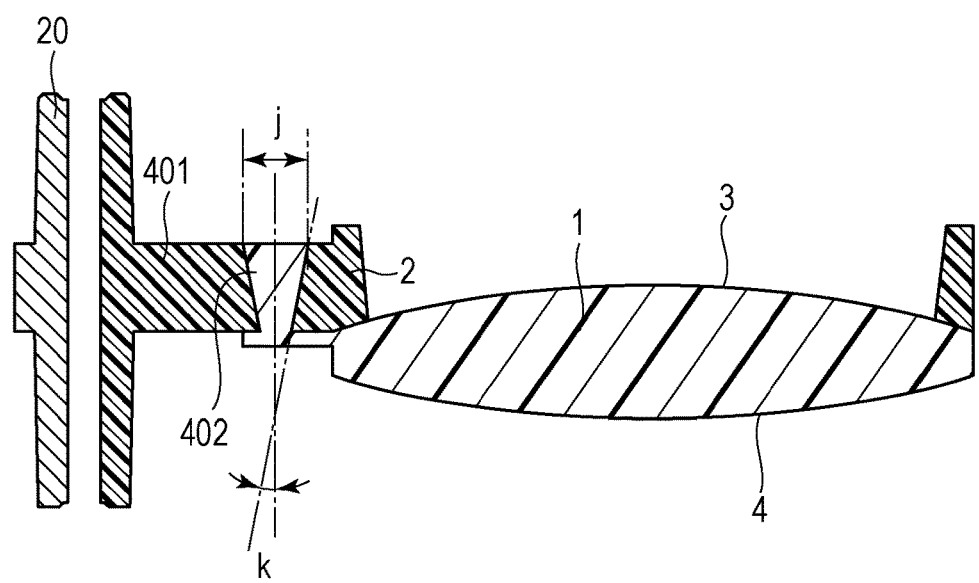
FIG. 5 is an illustration describing a working example according to an exemplary embodiment.

FIG. 5 is a sectional view taken along the V-V line in FIG. 3. The holder 2 having a tapered hole 402 formed in a bridge portion 401 that connects the cylindrical portion of the holder 2 to the sleeve 20 was manufactured, and the tapered hole 402 had a diameter j of 1 mm and a taper angle k of 10°.

Next, the method of manufacturing the optical component (lens with holder) according to the present working example will be described.

Figure 6A:
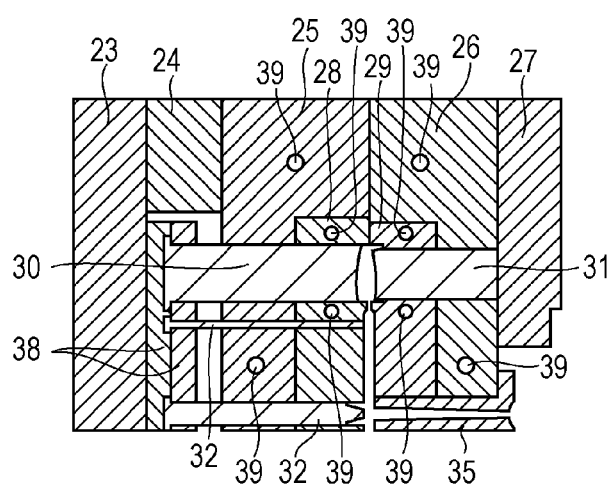
FIGS. 6A, 6B, and 6C are illustrations describing a working example according to an exemplary embodiment.

FIG. 6A is a sectional view of the mold used to mold the lens 1.

The mold includes a movable-side mounting plate 23, a spacer block 24, a movable-side mold plate 25, a stationary-side mold plate 26, and a stationary-side mounting plate 27. The mold further includes a mold component 30 that transfers the lens surface 4 on the objective side and a mold component 31 that transfers the lens surface 3 on the ocular side. A mold component 28 houses the mold component 30, and a mold component 29 houses the mold component 31. The mold further includes an ejector pin 32, an ejector plate 38, and a sprue bushing 35. A water pipe 39 allows warm water to pass therein to adjust the temperature of the mold.

Figure 6B:
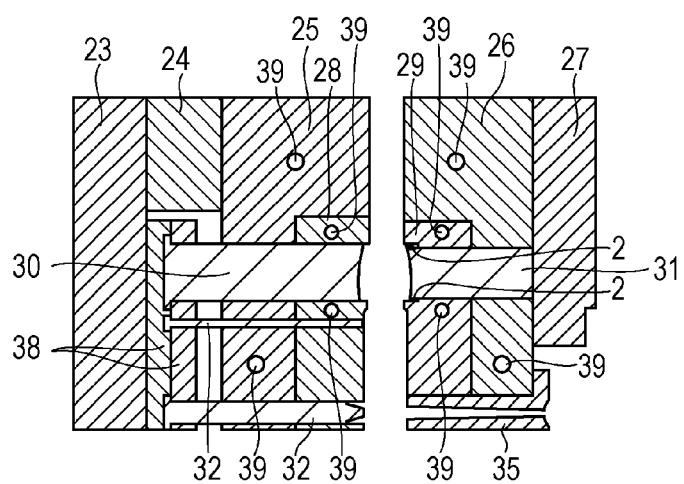

FIG. 6B is a sectional view illustrating the state in which the mold is opened and the holder 2 is inserted in the mold. The holder 2 was inserted between the mold component 31 that transfers the ocular-side lens surface 3 and the mold component 29 that houses the mold component 31 while the mold was open. Then, the mold was closed such that the outer peripheral surface and the front surface of the holder 2 were in firm contact with the mold component 29 that houses the mold component 31. Warm water at a temperature of 135° C. was passed through the water pipe 39.

The nozzle of a plasticizing apparatus (not illustrated) in the molding machine was made to abut against the sprue bushing 35 in this state, and the resin obtained by melting the material for forming the lens 1 was injected. The injection time was three seconds. Thus, it is speculated that the resin flowed around the back surface of the holder 2 and the interface between the holder 2 and the lens 1 was temporarily in a state of tight contact immediately after the injection. It is also speculated that the resin for forming the holder 2 was in a state in which the molecules therein can easily move upon being subjected to the heat and the force of the molten resin of the material for forming the lens 1.

In the dwelling process following the injection process, the molten resin of the material for forming the lens 1 was pressed against the lens surface transfer surface, and the lens surface was thus transferred. The dwelling time was 20 seconds.

Then, the mold was opened upon the cooling time of 140 seconds.

Figure 6C:
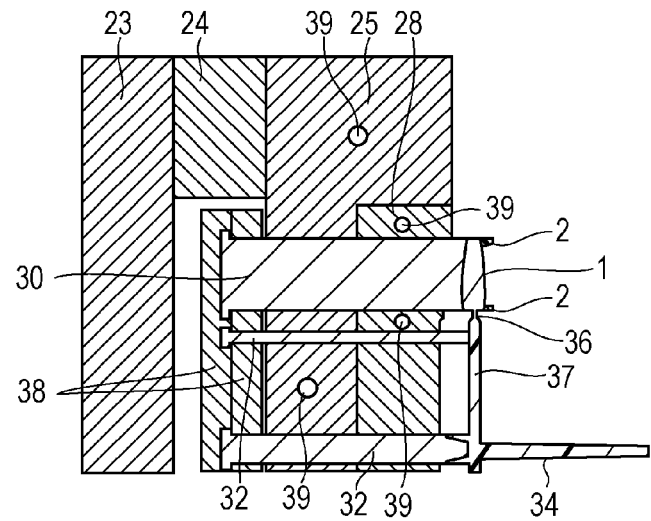
Figure 7:
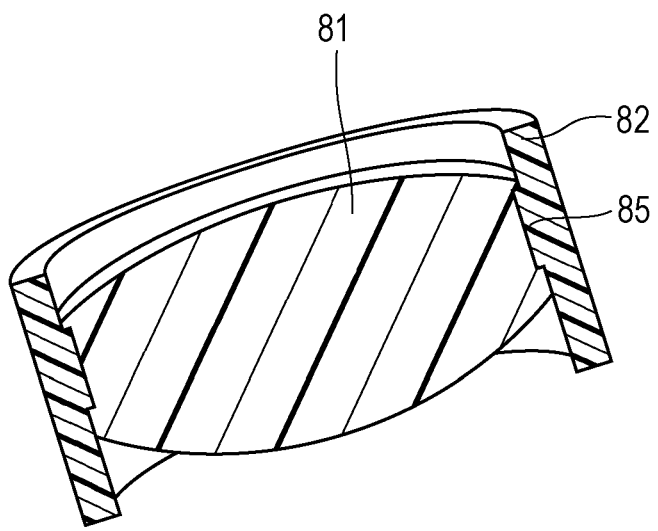
FIG. 7 is an illustration describing a conventional example taught in the prior art.

FIG. 6C is a sectional view illustrating the state in which the mold is opened and the ejection is completed. The ejector pin 32 and the mold component 30 that transfers the lens surface 4 on the objective side were moved forward, and the mold and the molded product were separated from each other, in this state, the molded product was discharged to the outside of the mold by a stripping device. With regard to each of the obtained lens with holder, the adhesive force between the lens 1 and the back surface of the holder 2 was completely eliminated, and the lens with holder having a highly accurate optical surface was obtained stably. The molten material for forming the lens 1 was in the tapered hole 402 provided in the bridge portion 401 that connects the cylindrical portion of the holder 2 to the sleeve 20. Thus, an undercut portion was formed, which made it possible to firmly integrate the lens 1 and the holder 2 into a unit.

The measurement of the shape accuracy of the extracted lens 1 has revealed that the shape error was no greater than 1 μm.

Although the holder material and the lens material were both cooled in the cooling process, the shrinkage amount of the material for forming the lens 1 was greater than the shrinkage amount of the material for forming the holder 2. Thus, it is speculated that the effect of the shrinkage force surpassed the effect of the adhesive force and that the adhesive force was eliminated during the cooling process. However, it is suspected that the lens surface 4 kept in tight contact with the lens surface transfer surface of the mold during this period, and little change in the surface accuracy associated with the tight contact being eliminated has occurred.

Furthermore, the obtained lens 1 and the obtained holder 2 were molten again, and their mold shrinkage factors were measured again. Then, the mold shrinkage factor of the lens 1 was 0.6%, and the mold shrinkage factor of the holder 2 was 0.3%, which were the same as those obtained before molding.

SECOND WORKING EXAMPLE

An optical component was manufactured in the same method as in the first working example except in the material for forming the holder.

With regard to the material for forming the holder in the second working example, a material in which a glass filler that had a fiber diameter of 10 μm and in which long fiber having a length of no less than 100 μm and short fiber having a length of less than 100 μm were blended was mixed in an amount of 30% to obtain the mold shrinkage factor of 0.2% and the temperature of deflection under load of 139° C. was used. Other conditions were identical to those of the first working example.

The shape error of each of the obtained lenses with holder was no greater than 1 μm, the adhesive force between the back surface of the holder and the lens was eliminated due to the air that entered into the interface between the lens and the back surface of the holder, and the lens with holder having a highly accurate optical surface was obtained stably.

FIRST COMPARATIVE EXAMPLE

An optical component was manufactured in the same method as in the first working example except in the material for forming the holder.

With regard to the material for forming the holder in the first comparative example, a material in which a glass filler that had a fiber diameter of 10 μm and in which long fiber having a length of no less than 100 μm and short fiber having a length of less than 100 μm were blended was mixed in an amount of 10% to obtain the mold shrinkage factor of 0.4% and the temperature of deflection under load of 135° C. was used. Other conditions were identical to those of the first working example.

With regard to the lens with holder obtained upon being stripped from the mold, ones in which the air entered into the interface between the lens and the back surface of the holder and the adhesive force between the back surface of the holder and the lens was eliminated and ones in which the adhesive force between the back surface of the holder and the lens partially remained were obtained variably among the molded products.

The ones in which the air entered into the interface between the lens and the back surface of the holder and the adhesive force between the back surface of the holder and the lens was eliminated resulted in a lens with holder having a highly accurate optical surface. The ones in which the tight contact between the back surface of the holder and the lens partially remained resulted in a defective product having a shape error of no less than 2 μm due to the distortion of the optical surface at a portion at which the tight contact remained even though the tight contact was eliminated upon being cooled in the atmosphere after the stripping.

SECOND COMPARATIVE EXAMPLE

An optical component was manufactured in the same method as in the first working example except in the material for forming the holder.

Polycarbonate that did not contain a glass filler and that was merely subjected to coloring process with a black dye was used as the material for forming the holder in the second comparative example. The mold shrinkage factor was 0.5%, and the temperature of deflection under load was 128° C. Other conditions were identical to those of the first working example.

In all of the lenses with holder obtained upon being stripped from the mold, the tight contact remained partially or entirely at the interface between the lens and the back surface of the holder.

The ones in which the tight contact between the back surface of the holder and the lens partially remained resulted in a defective product due to the distortion of the optical surface at a portion at which the tight contact remained even though the tight contact was eliminated upon being cooled in the atmosphere after the stripping. With regard to the samples in which the tight contact remained on the entire back surface of the holder, the tight contact was not eliminated even after being cooled in the atmosphere. The optical surface was distorted throughout the surface, and the shape error was no less than 4 μm, resulting in a defective product.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application. No. 2016-130910 filed Jun. 30, 2016, which is hereby incorporated by reference herein in its entirety.

What is claimed is:

1. An optical component comprising:
   a lens having a lens surface held in a holder;
   a portion of the holder in contact with the lens surface; and
   a holding portion configured to hold the lens in the holder,
   wherein a mold shrinkage factor of a material that forms the holder is smaller than a mold shrinkage factor of a material that forms the lens by no less than 0.3%.

2. The optical component according to claim 1,
   wherein the holding portion is a portion in which a projection portion projecting from an attachment portion formed on the lens cuts into the holder.

3. The optical component according to claim 2,
wherein the projection portion has a diameter that increases toward the attachment portion.

4. The optical component according to claim 1,
wherein the lens is an eyepiece, and an ocular-side lens surface is in contact with the holder.

5. The optical component according to claim 1,
wherein a material that forms the holder is a material in which reinforced fiber is mixed in a material containing polycarbonate, ABS, PS, PMMA, or a composite material thereof.

6. The optical component according to claim 5,
wherein the reinforced fiber has a content of no less than 10% by weight nor more than 50% by weight relative to the material that forms the holder.

7. The optical component according to claim 1,
wherein the material that forms the lens contains a cyclic olefin.

8. A camera comprising:
an optical component including a lens that has a lens surface and that is held in a holder,
a portion of the holder in contact with the lens surface, and
a holding portion configured to hold the lens in the holder is provided,
wherein a mold shrinkage factor of a material that forms the holder is smaller than a mold shrinkage factor of a material that forms the lens by no less than 0.3%.

9. An optical component manufacturing method for manufacturing an optical component in which a lens is held in a holder by:
injecting a molten resin into a cavity in a mold, wherein:
the holder includes a front surface, a back surface, an outer peripheral surface, and an inner peripheral surface, and the front surface and the outer peripheral surface are made to be in contact with the mold to constitute a portion of the cavity; and
a mold shrinkage factor of a material that forms the holder is smaller than a mold shrinkage factor of the molten resin by no less than 0.3%.

10. The optical component manufacturing method according to claim 9,
wherein the holder includes a hole having a diameter that decreases toward the cavity, and the molten resin is poured into the hole.

11. The optical component manufacturing method according to claim 10,
wherein the molten resin has a low compatibility with the material that forms the holder.

* * * * *